United States Patent [19]
Barth et al.

[11] Patent Number: 5,779,417
[45] Date of Patent: Jul. 14, 1998

[54] FASTENER HAVING PRIMARY AND SECONDARY THREADS

[75] Inventors: Gerald D. Barth, South Elgin; Frank W. Bechtel, Hanover Park, both of Ill.

[73] Assignee: Illinois Tool Works Inc., Glenview, Ill.

[21] Appl. No.: 855,799

[22] Filed: May 12, 1997

[51] Int. Cl.$^6$ ............................. F16B 23/00; F16B 35/04
[52] U.S. Cl. ........................... 411/412; 411/399; 411/426
[58] Field of Search ................................. 411/399, 411, 411/412, 413, 426

[56] References Cited

U.S. PATENT DOCUMENTS

| Re. 34,969 | 6/1995 | Dixon et al. | 411/412 |
|---|---|---|---|
| 4,820,235 | 4/1989 | Weber et al. | 411/399 X |
| 5,294,227 | 3/1994 | Forster et al. | 411/426 X |
| 5,601,553 | 2/1997 | Trebing et al. | 411/413 X |

*Primary Examiner*—Neill R. Wilson
*Attorney, Agent, or Firm*—Rockey, Milnamow & Katz, Ltd.

[57] ABSTRACT

In a fastener having a head, which may have having torque-absorbing ribs, and a shank, which is unitary with the head and which has a primary thread formation and a secondary thread formation. The primary thread formation, which defines axially spaced threads along a generally cylindrical portion of the shank and along a tapered tip of the shank, has a generally uniform radial dimension along the generally cylindrical portion of the shank. The secondary thread formation, which defines axially spaced threads between some of the threads defined by the primary thread formation, originates at a region spaced axially from the distal end of the generally cylindrical portion of the shank, terminates at the head, and tapers outwardly from the region where it originates toward the head. The secondary thread formation at the region adjoining the head has a radial dimension less than the generally uniform radial dimension of the primary thread formation along the generally cylindrical portion of the shank. The region where the secondary thread formation originates is located between the proximal and distal ends of the generally cylindrical portion of the shank.

12 Claims, 2 Drawing Sheets

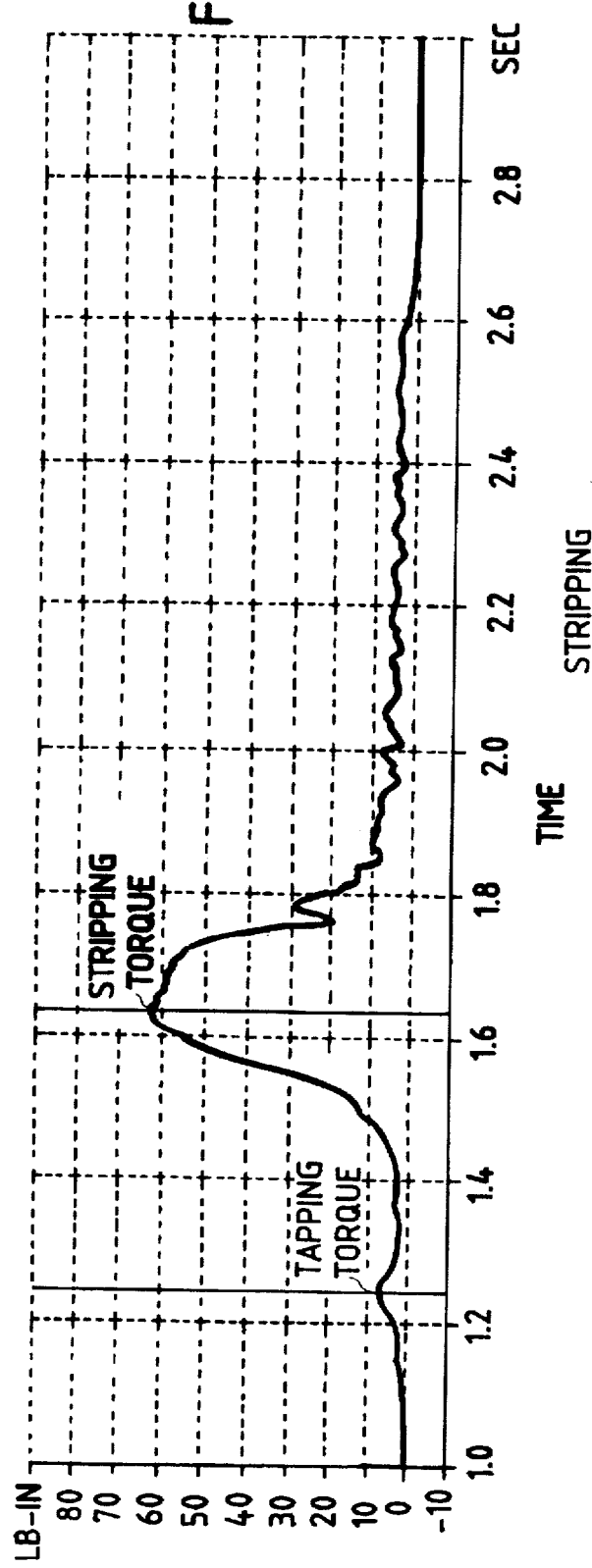
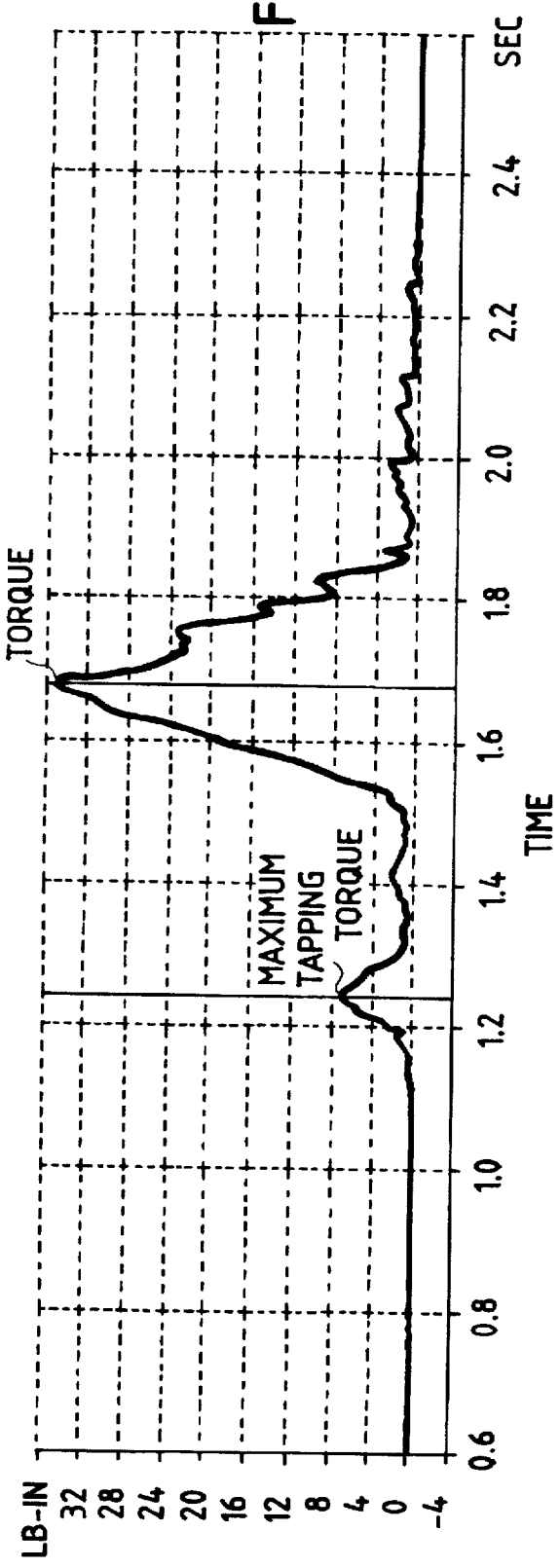

FASTENER HAVING PRIMARY AND SECONDARY THREADS

TECHNICAL FIELD OF THE INVENTION

This invention pertains to a fastener of a type employed to fasten two sheet-metal plates to each other. The fastener has a head, which may have torque-absorbing ribs, and a shank, which has a primary thread formation and a secondary thread formation. The secondary thread formation is tapered.

BACKGROUND OF THE INVENTION

A fastener of the type noted above is used for fastening a sheet-metal plate, which may be conveniently called a faying plate, to another sheet-metal plate, which may be conveniently called a tapping plate. Commonly, the faying plate is pre-punched with a hole that may be conveniently called a clearance hole and the tapping plate is pre-punched with a hole that may be conveniently called a tapping hole, the tapping hole being smaller than the clearance hole. Commonly, the shank is adapted to pass freely through the clearance hole, to enter the tapping hole at a tapered tip, and to tap a complementary thread around the tapping hole, via a self-tapping thread on the shank, when the fastener is driven.

Among other data characterizing a fastener of the type noted above, it is convenient to refer to a tapping torque, which is the torque required for the self-tapping thread to tap the complementary thread when the fastener is driven rotatably. Moreover, it is convenient to refer to a stripping torque, which is the torque required for the self-tapping thread to strip the complementary thread so that the shank rotates freely within the tapping hole.

Commonly, fasteners of the type noted above are produced in large quantities, from which statistically meaningful samples are drawn for testing. Among other data obtainable from testing of any given sample, it is convenient to refer to a statistical maximum tapping torque, which is the maximum torque required for the self-tapping thread of any of the tested fasteners of the sample to tap such a complementary thread. Moreover, it is convenient to refer to a statistical minimum stripping torque, which is the torque required for the self-tapping thread of any of the tested fasteners of the sample to strip the complementary thread so that the shank rotates freely within the tapping hole.

In many applications, such fasteners are driven via pneumatically or electrically powered driving tools, each of which is arranged to apply a driving torque to a fastener head. Desirably, each such tool is adjusted so as to stall or so as to stop driving when a nominal maximum driving torque is applied, which is higher than the statistical maximum tapping torque for such fasteners and lower than the statistical minimum stripping torque for such fasteners. Since such tools tend to be imprecisely adjustable, it is desirable for the statistical minimum stripping torque to be substantially higher than the statistical maximum tapping torque for any given quantity of threaded fasteners of the type noted above.

SUMMARY OF THE INVENTION

This invention provides a unique arrangement of thread formations in a fastener of the type noted above. The fastener has a head and a shank, which is unitary with the head and which may have a tapered tip. The shank has a primary thread formation and a secondary thread formation.

The primary thread formation, which defines axially spaced threads along a generally cylindrical portion of the shank and along a tapered tip of the shank, has a generally uniform radial dimension along the generally cylindrical portion of the shank. The radial dimension of the primary thread formation is measured radially from the thread root.

The secondary thread formation defines axially spaced threads between some of the threads defined by the primary thread formation. According to this invention, the secondary thread formation originates at a region spaced axially from the distal end of the generally cylindrical portion of the shank and terminates at the head, with a radial dimension that tapers outwardly from the region where it originates toward the head. The radial dimension of the secondary thread formation is measured radially from the thread root.

Preferably, the secondary thread formation at the region adjoining the head has a radial dimension that is substantially equal to the generally uniform radial dimension of the primary thread formation along the generally cylindrical portion of the shank. Preferably, the region where the secondary thread formation originates is located between the proximal and distal ends of the generally cylindrical portion of the shank, so as to be thus spaced from the distal end thereof.

The head may have torque-absorbing ribs. Thus, except for the primary and secondary thread formations, the fastener may be substantially similar to the fastener disclosed in a copending patent application filed by Gerald D. Barth and Frank W. Bechtel in the U.S. Patent and Trademark Office on Mar. 31, 1997, under Ser. No. 08/829/349 (ITW Case 8047) for IMPROVED FASTENER HAVING TORQUE-ABSORBING RIBS, the disclosure of which application is incorporated herein by reference.

The secondary thread formation has an axial length that is determined by the combined thicknesses of the faying plate and the tapping plate. Preferably, the secondary thread formation has an axial length enabling the fastener to be effectively employed where each such plate has a thickness in a range from approximately 0.010 inch to approximately 0.030 inch. Thus, the secondary thread formation enables the fastener to be effectively employed with very thin tapping plates, such as a tapping plate having a thickness of approximately 0.010 inch.

These and other objects, features, and advantages of this invention are evident from the following description of a preferred embodiment of this invention, with reference to the accompanying drawings.

BRIEF DESCRIPTION OF THE DRAWINGS

FIG. 5 is a graphical representation of torque versus time for a typical fastener similar to the preferred embodiment and for a pneumatically powered driving tool, which is not shown.

FIG. 6 is a graphical representation of torque versus time for a typical fastener similar to the alternative embodiment and for a pneumatically powered driving tool, which is not shown.

DETAILED DESCRIPTION OF THE ILLUSTRATED EMBODIMENTS

Figure 1:
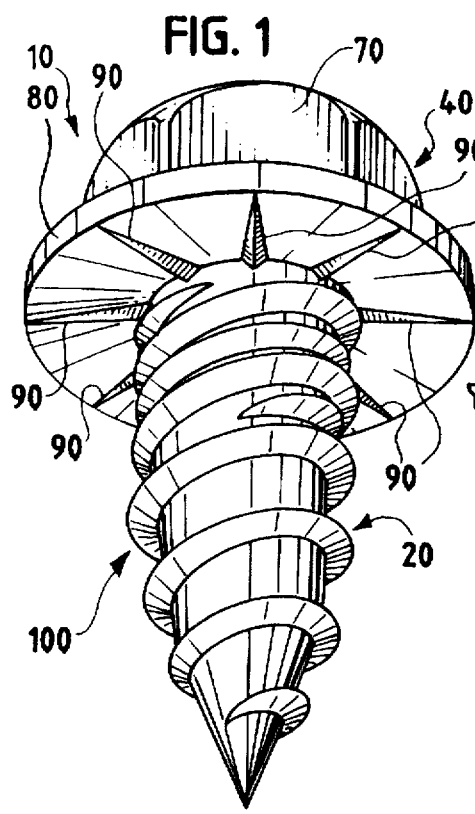
FIG. 1 is a perspective view of a fastener constituting a preferred embodiment of this invention.
Figure 2:
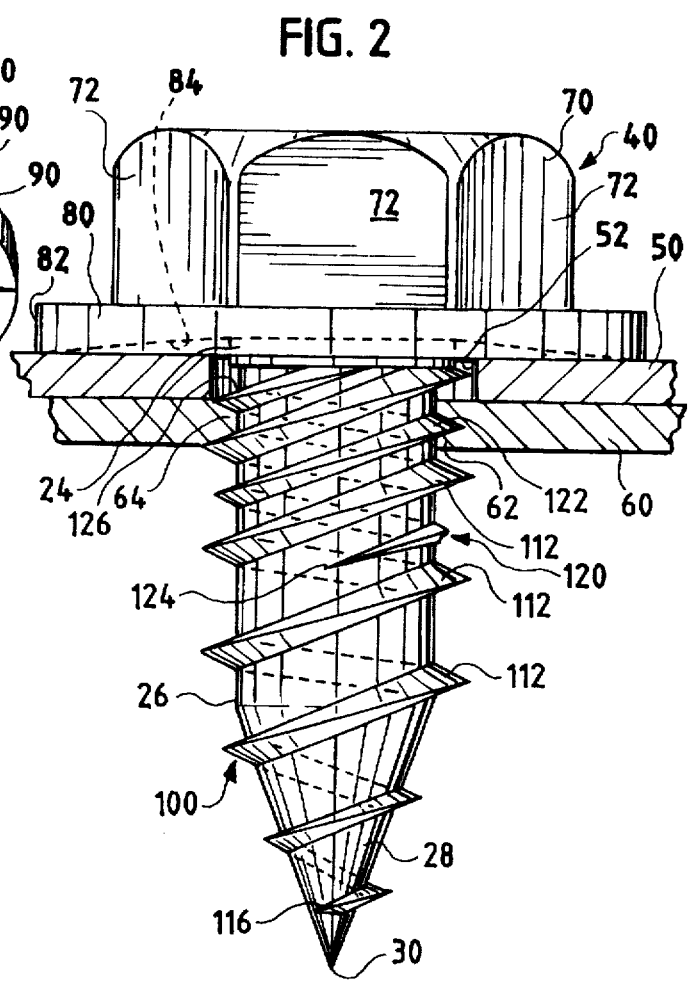
FIG. 2, on a larger scale, is an elevational view of the fastener of FIG. 1, along with a faying plate and a tapping plate, which are shown fragmentarily.
Figure 3:
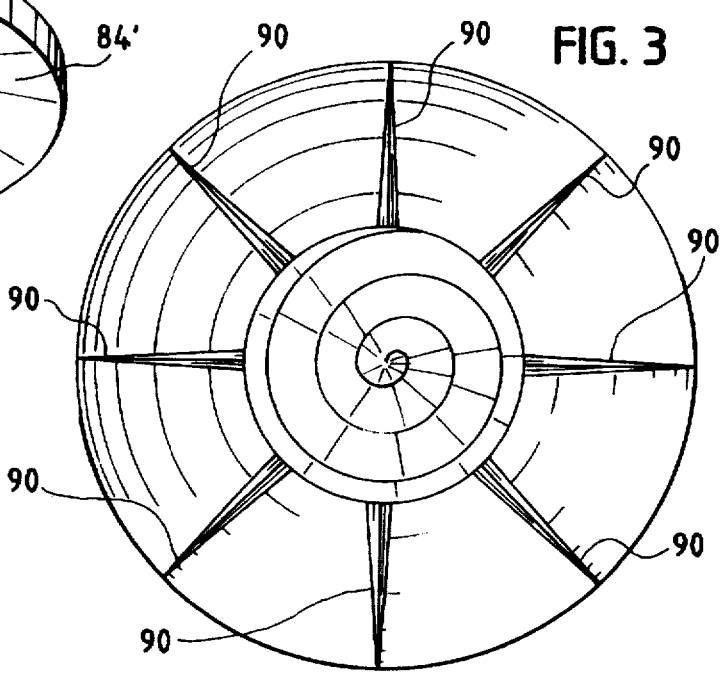
FIG. 3 is an axial view of the fastener, as seen from its pointed end.

As shown in FIGS. 1, 2, and 3, a fastener 10 of the type noted above constitutes a preferred embodiment of this invention. The fastener 10 has a shank 20, which defines an axis and which is threaded in a unique manner, and a head 40, which is unitary with the shank 20. The shank 20 has a generally cylindrical portion 22, which has a proximal end 24 adjoining the head 40 and a distal end 26, and a tapered tip 28, which has a rounded end 30 and which adjoins the shank 20 at the distal end 26.

As shown in FIG. 3, the fastener 10 is employed for fastening a faying plate 50, which is prepared, as by punching, with a clearance hole 52, to a tapping plate 60, which is prepared, as by punching, with a tapping hole 62. Before the fastener 10 is driven, the clearance hole 52 and the tapping hole 62 are circular, the clearance hole 52 having a comparatively larger diameter and the tapping hole 62 having a comparatively smaller diameter. When the fastener 10 is driven rotatably, the shank 20 is adapted to pass freely through the clearance hole 52, to enter the tapping hole 62 at the tapered tip 28, and to tap a complementary thread 64 around the tapping hole 62. In another embodiment (not shown) contemplated by this invention, the faying plate may not be not prepared with a clearance hole and the tapping plate may not be prepared with a tapping hole.

As shown, the head 40 has a driving portion 70 with a hexagonal shape defining tool-engaging flats 72 whereby the driving portion 70 is adapted to be rotatably driven by a pneumatically powered driving tool (not shown) of a conventional type having a driving head coacting with the tool-engaging flats 72 so as to drive the fastener 10 rotatably about the axis defined by the shank 20. In other embodiments (not shown) contemplated by this invention, the head of the fastener may have a different shape, such as a truss or dome shape. Except as explained herein, the precise shape of the head is outside the scope of this invention.

The head 40 has a bearing portion 80 adjoining the shank 20, having an annular, peripheral edge 82, and having a clamping surface 84 facing the tapered tip 28 of the shank 20. The clamping surface 84, which flares outwardly toward the tapered tip 28 of the shank 20, is frusto-conical and defines a conical angle of about 5° relative to a plane perpendicular to the axis defined by the shank 20.

The clamping surface 84 may have eight essentially identical, torque-absorbing ribs 90, which project from the clamping surface 84, toward the shank 20, and which are spaced at regular intervals about the axis defined by the shank 20. The torque-absorbing ribs 90 are similar to the torque-absorbing ribs disclosed in the copending patent application noted above (ITW Case 8047) the disclosure of which is incorporated herein by reference. In other embodiments (not shown) contemplated by this invention, a different number of such ribs may project from the clamping surface, or the clamping surface is free of such ribs.

The shank 20 is formed so as to have a primary thread formation 100, which is continuous, which is self-tapping, and which defines axially spaced threads 112 having a generally uniform radial dimension along the generally cylindrical portion 22 of the shank 20 and similarly spaced threads 114 along the tapered tip 28. The primary thread formation 100 originates at a region 116 near the rounded end 30 of the tapered tip 28 and tapers outwardly toward the distal end 26 of the generally cylindrical portion 22. The radial dimension of the primary thread formation 100 increases from the region 116, along the tapered tip 28 to the distal end 26 of the generally cylindrical portion 22, until the radial dimension thereof reaches the generally uniform dimension thereof along the generally cylindrical portion 22.

The shank 20 is formed so as to have a secondary thread formation 120, which is continuous, which is self-tapping, and which defines axially spaced threads 122 between some of the threads 112 defined by the primary thread formation 100, along the generally cylindrical portion 22 of the shank 20. The secondary thread formation 120 originates at a region 124 located between the proximal end 24 of the generally cylindrical portion 22 and the distal end 26 thereof so as to be axially spaced from the distal end 26 thereof, terminates at the head 40, and tapers outwardly from the region 124 toward the region 126. The radial dimension of the secondary thread formation 120 increases from the region 124, along the generally cylindrical portion 22 to the head 40, until the radial dimension thereof reaches a maximum radial dimension that is substantially equal to the generally uniform radial dimension of the primary thread formation 110 along the generally cylindrical portion 22. At its maximum radial dimension, the secondary thread formation 120 is formed incompletely, as indicated at a region 126 in FIG. 2. As shown in FIG. 2, the radial dimension of the secondary thread formation 120 tapers outwardly and increases over a major portion of the axial length of the secondary thread formation.

The secondary thread formation 120, which is designed for a range of plate thicknesses, has an axial length that is determined by the combined thicknesses of the faying plate 50 and the tapping plate 60. With thicker plates 50, 60, a greater portion of the axial length of the secondary thread formation 120 is engaged. With thinner plates 50, 60, a lesser portion of the axial length of the secondary thread formation 120 is engaged. With thinner plates 50, 60, however, the secondary thread formation 120 engages the tapping plate 60 where the secondary thread formation 120 has tapered outwardly so as to cut deeply into the tapping plate 60, whereby minimum stripping torque tends to be much greater compared to what the sripping torque would have been if the secondary thread formation 120 were omitted. Preferably, the secondary thread formation 120 has an axial length enabling the fastener 50, 60, to be effectively employed where each such plate 50, 60, has a thickness in a range from approximately 0.010 inch to approximately 0.030 inch.

Figure 4:
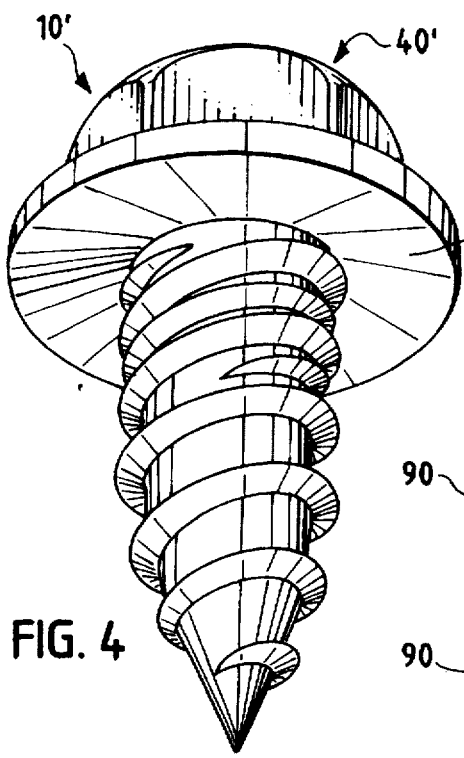
FIG. 4 is a perspective view of a fastener constituting an alternative embodiment of this invention, the alternative embodiment being similar to the preferred embodiment but omitting torque-absorbing ribs provided on the preferred embodiment.

As shown in FIG. 4, in which reference numbers with primes refer to elements similar to elements referenced by similar numbers without primes in FIGS. 1, 2, and 3, a fastener 10' constituting an alternative embodiment of this invention is similar to the fastener 10 except that the fastener 10 does not have any torque-absorbing ribs similar to the torque-absorbing ribs 90 of the fastener 10. Rather, as shown in FIG. 4, the clamping surface 84' of the head 40' of the fastener 10' is a smooth, continuous, frusto-conical surface. Alternatively, the clamping surface 84' may be flat.

As the fastener 10 is driven, the tapping hole 62 in the tapping plate 60 is tapped initially and completely by the primary thread formation 110 and is tapped subsequently but incompletely by the secondary thread formation, whereupon the torque required for the secondary thread formation 120 subsequently but incompletely to tap the tapping hole 62 and the tap required to overcome friction between the clamping surface 84 with the torque-absorbing ribs 90 and the faying plate 50 are additive so as to define the stripping torque for the fastener 10. The fastener 10' performs similarly except that the stripping torque for the fastener 10' is lower than the stripping torque for the fastener 10 because the fastener 10' does not have any torque-absorbing ribs similar to the torque-absorbing ribs 90 of the fastener 10.

With a fastener similar to the fastener 10 or with a fastener similar to the fastener 10', the stripping torque is found to be substantially greater than the stripping torque for an otherwise similar fastener (not shown) without a secondary thread formation similar to the secondary thread formation 120. Furthermore, the torque required initially to remove a fastener similar to the fastener 10 or to remove a fastener similar to the fastener 10' is found to be substantially greater than the torque required initially to remove an otherwise similar fastener (not shown) without a secondary thread formation similar to the secondary thread formation 120.

As represented graphically in FIG. 5 for a typical fastener similar to the fastener 10 and in FIG. 6 for a typical fastener similar to the fastener 10' (whereby the fasteners of FIGS. 5 and 6 are similar except that the fastener of FIG. 5 has torque-absorbing ribs while the fastener of FIG. 6 does not have torque-absorbing ribs) a wide range is found to exist between the tapping torque and the stripping torque for the respective fasteners when tested by being driven by similar pneumatically powered tools, at similar rotational speeds, through similar faying and tapping plates prepared with similar clearance and tapping holes.

As represented in FIG. 5 or in FIG. 6, the wide range enables a pneumatically or electrically powered driving tool (not shown) of a conventional type to be readily adjusted so that its nominal maximum driving torque exceeds the statistical maximum tapping torque of the tested fasteners but does not exceed the statistical minimum stripping torque of the tested fasteners, even if such tool cannot be precisely adjusted, whereby it is predictable within a range of statistically determinable errors that such tool can drive all fasteners in the production quantity without stripping the complementary thread tapped by any fasteners in the production quantity.

Various modifications may be made in the preferred or alternative embodiment described above without departing from the scope and spirit of this invention.

What is claimed is:

1. A fastener having a head and a shank unitary with the head, the shank defining an axis and having a generally cylindrical portion, the generally cylindrical portion having a proximal end adjoining the head and a distal end, the shank having a primary thread formation and a secondary thread formation, the primary thread formation defining axially spaced threads along the generally cylindrical portion of the shank and having a generally uniform radial dimension along the generally cylindrical portion of t he shank, the secondary thread formation defining axially spaced threads between at least some of the threads defined by the primary thread formation, the secondary thread formation originating at a region spaced axially from the distal end of the generally cylindrical portion of the shank and terminating at a region adjoining the head, with a radial dimension tapering outwardly and increasing over a major portion of the axial length of the secondary thread formation, from the region where the secondary thread formation originates, toward the head.

2. The fastener of claim 1 wherein the secondary thread formation at the region adjoining the head has a radial dimension that is substantially equal to the generally uniform radial dimension of the primary thread formation along the generally cylindrical portion of the shank.

3. The fastener of claim 1 wherein the region where the secondary thread formation originates is located between the proximal and distal ends of the generally cylindrical portion of the shank.

4. The fastener of claim 3 wherein the secondary thread formation at the region adjoining the head has a radial dimension that is substantially equal to the generally uniform radial dimension of the primary thread formation along the generally cylindrical portion of the shank.

5. A fastener having a head and a shank unitary with the head, the shank defining an axis and having a generally cylindrical portion and a tapered tip, the generally cylindrical portion having a proximal end adjoining the head and a distal end adjoining the tapered tip, the shank having a primary thread formation and a secondary thread formation, the primary thread formation defining axially spaced threads along the generally cylindrical portion of the shank and along the tapered tip of the shank, the primary thread formation having a generally uniform radial dimension along the generally cylindrical portion of the shank, the secondary thread formation defining axially spaced threads between at least some of the threads defined by the primary thread formation, the secondary thread formation originating at a region spaced axially from the distal end of the generally cylindrical portion of the shank and terminating at a region adjoining the head, with a radial dimension tapering outwardly and increasing over a major portion of the axial length of the secondary thread formation, from the region where the secondary thread formation originates, toward the head.

6. The fastener of claim 5 wherein the secondary thread formation at the region adjoining the head has a radial dimension that is substantially equal to the generally uniform radial dimension of the primary thread formation along the generally cylindrical portion of the shank.

7. The fastener of claim 5 wherein the region where the secondary thread formation originates is located between the proximal and distal ends of the generally cylindrical portion of the shank.

8. The fastener of claim 7 wherein the secondary thread formation at the region adjoining the head has a radial dimension that is substantially equal to the generally uniform radial dimension of the primary thread formation along the generally cylindrical portion of the shank.

9. A fastener having a head and a shank unitary with the head, the head having torque-absorbing ribs facing the shank, the shank defining an axis and having a generally cylindrical portion and a tapered tip, the generally cylindrical portion having a proximal end adjoining the head and a distal end adjoining the tapered tip, the shank having a primary thread formation and a secondary thread formation, the primary thread formation defining axially spaced threads along the generally cylindrical portion of the shank and along the tapered tip of the shank, the primary thread formation having a generally uniform radial dimension along the generally cylindrical portion of the shank, the secondary thread formation defining axially spaced threads between at least some of the threads defined by the primary thread formation, the secondary thread formation originating at a region spaced axially from the distal end of the generally cylindrical portion of the shank and terminating at the head, with a radial dimension tapering outwardly from the region where the secondary thread formation originates toward the head and increasing until the radial dimension reaches a maximum at a region adjoining the head.

10. The fastener of claim 9 wherein the secondary thread formation at the region adjoining the head has a radial dimension that is substantially equal to the generally uniform radial dimension of the primary thread formation along the generally cylindrical portion of the shank.

11. The fastener of claim 9 wherein the region where the secondary thread formation originates is located between the proximal and distal ends of the generally cylindrical portion of the shank.

12. The fastener of claim 11 wherein the secondary thread formation at the region adjoining the head has a radial dimension that is substantially equal to the generally uniform radial dimension of the primary thread formation along the generally cylindrical portion of the shank.

* * * * *